(12) United States Patent
Oh

(10) Patent No.: US 6,515,951 B1
(45) Date of Patent: Feb. 4, 2003

(54) DISK EJECTING METHOD

(75) Inventor: Seung Hyun Oh, Kyunggi-do (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/774,613

(22) Filed: Feb. 1, 2001

(30) Foreign Application Priority Data

Feb. 1, 2000 (KR) .............................................. 00-4954

(51) Int. Cl.$^7$ ................................................ G11B 7/00
(52) U.S. Cl. .................................... 369/53.37; 369/176
(58) Field of Search ............................. 369/44.11, 47.1, 369/53.1, 53.37, 77.2, 79, 239, 201, 190, 187, 188, 185, 184, 176

(56) References Cited

U.S. PATENT DOCUMENTS 6,243,333 B1 * 6/2001 Kanazawa et al. ........ 369/44.11

* cited by examiner

*Primary Examiner*—Muhammad Edun
(74) *Attorney, Agent, or Firm*—Birch, Stewart, Kolasch & Birch, LLP

(57) ABSTRACT

The present invention relates to a method for ejecting a disk completely even though it has been caught in a slot while being ejected with its upside down or because of malfunction of a sensor detecting whether a disk has been ejected or inserted. This disk ejecting method drives a disk ejecting motor for a predetermined time irrespective of the output status of a sensor detecting whether a disk has been ejected, when a command requesting ejection of an inserted disk is received.

13 Claims, 2 Drawing Sheets

DISK EJECTING METHOD

BACKGROUND OF THE INVENTION

1. Field of the Invention

The present invention relates to a method for ejecting an inserted disk completely even though it has been caught in a slot while being ejected with its upside down or because of malfunction of a sensor detecting whether a disk has been ejected or inserted.

2. Description of the Related Art

A disk drive, which is commonly connected to a personal computer (PC), reads data written in an optical disk and transmits to a PC through a connecting interface. A disk drive has two types for disk insertion/ejection. Two types are tray-type and slot-type. A slot-type disk drive has a detecting means used for determining whether a disk has been ejected or inserted completely. The detecting means may be constructed by sensors or switches. In the sensor-type disk drive, two sensors installed along the disk loading/unloading path detect whether a disk is ejected completely or not. In the switch-type disk drive, the contacting status of a switch is changed when a disk is ejected completely, however, the switch mechanism is not so simple that it is difficult to slim a disk drive equipped with the switch. Accordingly, the disk drive of sensor-type is widely used.

When a user inserts an optical disk into a slot-type disk drive, the disk may be sometimes inserted into a slot with its upside down due to carelessness of a user. Nevertheless, the disk drive may consider that the disk has been inserted normally since advertising pictures such as company logo drawn on the back side of the disk do not pass under or over a sensor 2 detecting whether there is the recording side thereunder or thereover as shown in FIG. 1. Then, a user will request the inserted disk to be ejected because the data reproduction fails. However, the advertising pictures drawn on the back side may pass under or over the sensor 2 at this time during the disk ejection.

If a black area of the advertising pictures is positioned under or over the sensor 2, a beam of the sensor 2 incident on the area is not reflected, which makes the output signal of the sensor detecting the reflecting beam be changed. Therefore, the disk drive considers that the disk has been ejected completely based on the change of the output signal, and stops disk ejecting operation. Then, the disk remains caught in the slot as shown in FIG. 1 so that it is very difficult for a user to take out the disk from the slot.

Even though a disk has been inserted normally, a disk may remain caught in the slot as shown in FIG. 1 during disk ejection if the sensor 2 can not detect the reflected beam due to stains of recording surface or its malfunction.

SUMMARY OF THE INVENTION

It is an object of the present invention to provide a disk ejecting method enabling an inserted disk to be ejected completely at the ejecting request even if the disk has been caught in a slot due to upside-down insertion of a disk or malfunction of a sensor.

A disk ejecting method in accordance with the present invention drives a disk ejecting motor irrespective of the output status of a sensor detecting whether a disk has been ejected or not, when a command requesting ejection of an inserted disk is received.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFFERRED EMBODIMENTS

In order that the invention may be fully understood, preferred embodiments thereof will now be described with reference to the accompanying drawings.

Figure 2:
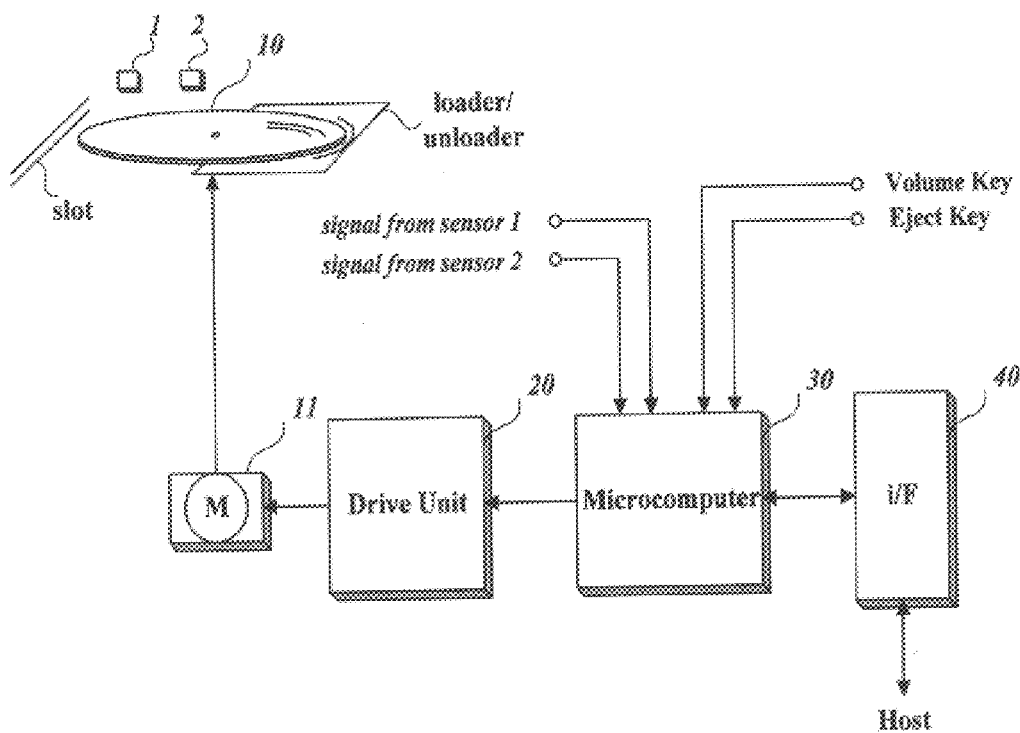
FIG. 2 shows partial elements of a disk drive to which a disk ejecting method according to the present invention is applied.

FIG. 2 shows partial elements of a disk drive for reproducing data written in an optical disk and providing the read data to a connected host such as a PC. The device of FIG. 2 comprises an ejecting motor 11 ejecting an inserted disk 10; a drive unit 20 driving the ejecting motor 11; an interface 40 sending/receiving data to/from a connected PC; and a microcomputer 30 conducting disk reproduction and overall control. The disk drive of FIG. 2 has an 'EJECT' key and a 'VOLUME' key on the front panel and two optical sensors 1 and 2 installed along the disk loading/unloading path. The sensor 2 is installed more inward from a slot than the other sensor 1.

Figure 3:
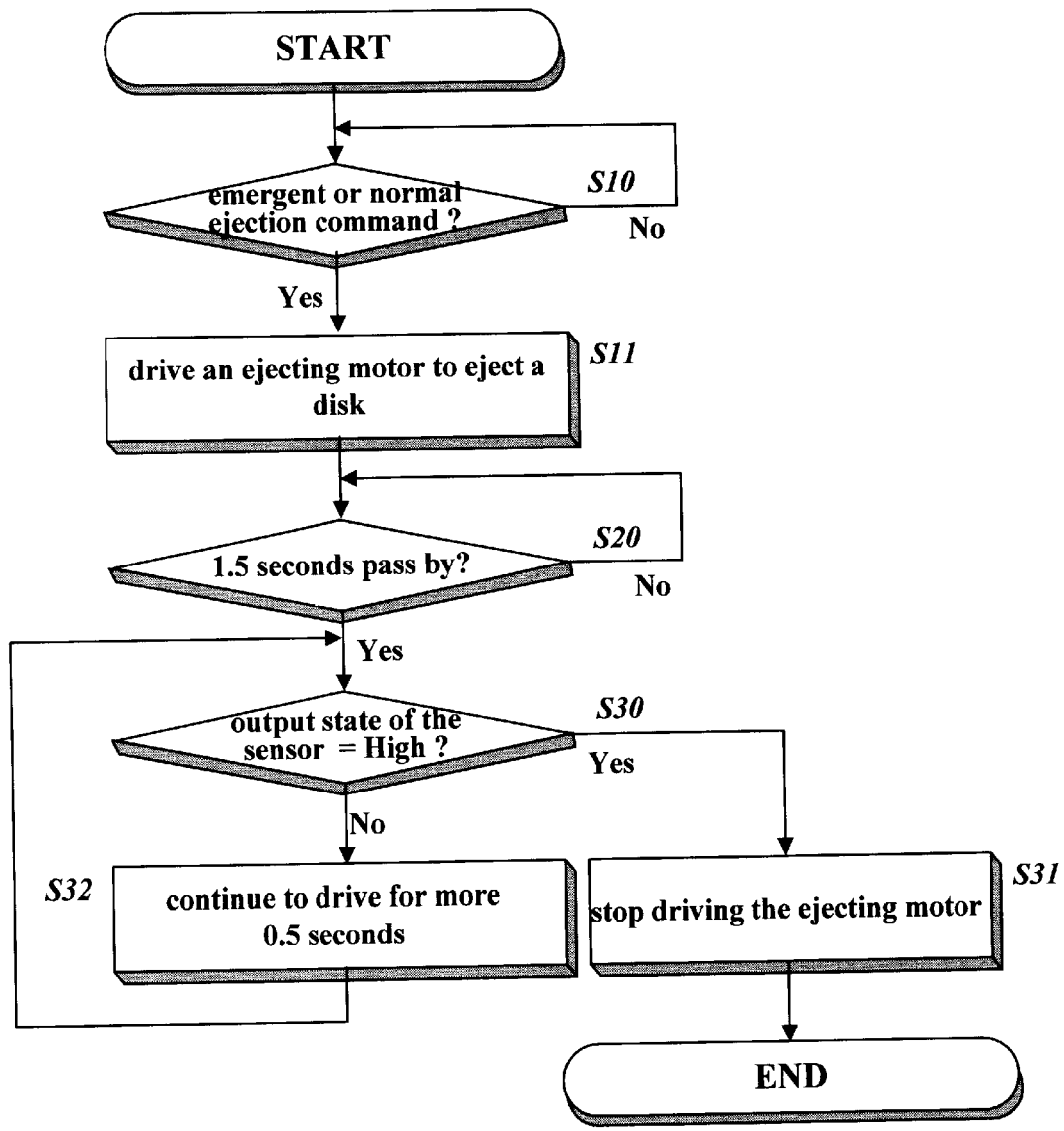
FIG. 3 is a flow chart embodying a disk ejecting method according to the present invention.

FIG. 3 is a flow chart embodying a disk ejecting method according to the present invention. The flow chart of FIG. 3 is explained in detail with reference to FIG. 2.

When the disk 10 is inserted into the slot and then clamped exactly by a disk clamper, the microcomputer 30 rotates the inserted disk 10 through the drive unit 20 to conduct an initial operation necessary for data reproduction. If the initial operation fails due to upside-down insertion or since the disk is not clamped exactly, the microcomputer 30 tries to eject the disk through driving the ejecting motor 11 at a user's ejection request.

At this time, an advertising pictures drawn on the back side of the disk, which is inserted with its upside down, may pass by the detecting point of the sensor 2 as mentioned above.

Figure 1:
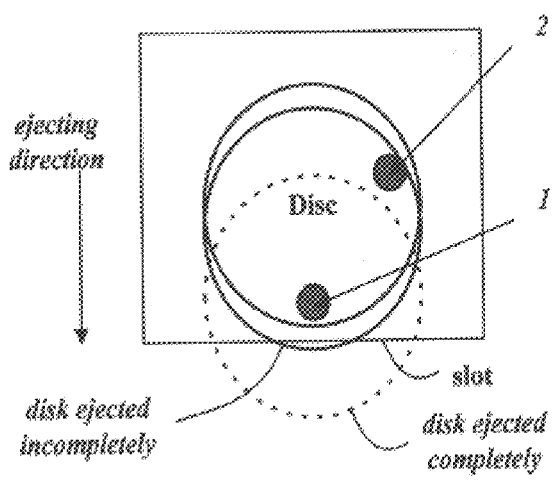
FIG. 1 shows that a disk has been ejected incompletely from a slot of a disk drive due to ejection interruption.

The moment a dark area of the advertising pictures is positioned under or over the sensor 2 during being ejected, a beam, which is radiated from the sensor 2, incident on the dark area is not reflected. Then, the output signal of the sensor 2 sensing the reflecting beam is changed, for example, from LOW to HIGH. According to the signal transition, the microcomputer 30 misunderstands that the disk has been ejected completely, and stops the driving of the ejecting motor 11. Then, the disk remains caught in the slot as shown in FIG. 1.

Knowing that the disk has been jammed in the slot, a user pushes the 'EJECT' and the 'VOLUME' key at the same time (S10) for emergent ejection which requires forcible ejection. Then, the microcomputer 30 drives the ejecting motor 11 through the drive unit 20 irrespective of the HIGH state of the sensor 2 for a predetermined time, for example, 1.5 seconds (S11). This ejecting operation enables the jammed disk to be ejected completely. The predetermined time may be set differently according to the driven characteristic of an ejecting motor.

This ejecting method can be also applied at a normal ejecting request. The ejecting procedure to be conducted at a normal ejecting request is same with the flow of FIG. 3 except that disk ejection is initiated by a normal ejection command instead of an emergent ejection one. The press of 'EJECT' key only is interpreted as a normal ejection command. In addition, a normal ejection command may be delivered to the disk drive from a PC.

If a PC transmits a normal ejection command to the disk drive, the microcomputer 30 receives the normal ejection command through the interface 40 (S10), and drives the ejecting motor 11 for about 1.5 seconds (S11) to eject an inserted disk 10. During the ejecting time of 1.5 seconds, the microcomputer 30 disregards the signal change, if any, of the sensor 2.

To complete the disk ejection requested by a normal or an emergent ejection command, the microcomputer 30 checks the output state of the sensor 2 (S30) after 1.5-second driving of the motor 11 is done (S20). If the output state of the sensor 2 is HIGH, the microcomputer 30 stops driving the motor 11 (S31), otherwise, it continues to drive the motor 11 for more 0.5 seconds (S32). The operations S30 and S32 are repeated by the microcomputer 30 until the output signal of the sensor 2 is changed to HIGH.

The disk ejecting method according the present invention always makes it possible to eject an inserted disk completely even if the disk has been caught in a slot due to upside-down insertion of a disk or malfunction of a sensor, thereby reducing efforts or annoying works of a user to pull out the disk caught in the slot.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A disk ejecting method of a disk drive, comprising the steps of:
    (a) receiving a command requesting ejection of an inserted disk;
    (b) driving a disk ejecting motor to eject the disk according to the reception of the command;
    (c) detecting whether the motor is stopped based on an output of a sensor which detects a position of the disk;
    (d) determining whether a subsequent command for ejecting the disk is received; and
    (e) driving forcibly the disk ejecting motor irrespective of the output of the sensor based on a result of the determining step.

2. The method set forth in claim 1, wherein said step (a) or (d) receives a prespecified ejection command from a connected host.

3. The method set forth in claim 1, wherein said step (d) receives the subsequent command for ejecting the disk generated when a switch disposed at a front panel of the disk drive is pressed.

4. The method set forth in claim 1, wherein said step (e) drives the disk ejecting motor for a predetermined time.

5. The method set forth in claim 4, further comprising the steps of checking the output of said sensor after the predetermined-time driving of the disk ejecting motor is done, and determining whether or not to stop driving the motor based on the checked result.

6. A disk ejecting method of a disk drive which includes a disk ejecting motor driven by a command requesting ejection of an inserted disk and stopped by an output of a sensor that indicates that the disk is ejected completely, comprising the steps of:
    (a) receiving a forcible ejection command requesting ejection of an inserted disk;
    (b) driving forcibly the disk ejecting motor for ejecting an inserted disk irrespective of the output of the sensor according to the forcible ejection command; and
    (c) determining whether to stop driving the motor based on whether a predetermined time elapses.

7. The method set forth in claim 6, further comprising the steps of checking the output of said sensor after the predetermined-time driving of the disk ejecting motor is done, and determining whether or not to stop driving the motor based on the checked result, wherein, in the determining step, if the output of the sensor indicates that the disk is not ejected, the disk ejecting motor is driven during a predetermined time or if the output state of the sensor indicates that the disk is ejected completely, the disk ejecting motor is stopped.

8. A disk ejecting method of a disk drive, comprising the steps of:
    (a) receiving a command requesting ejection of an inserted disk;
    (b) driving a disk ejecting motor to eject the disk according to the reception of the command;
    (c) detecting whether the motor is stopped after the driving step;
    (d) determining whether a subsequent command for ejecting the disk is received; and
    (e) driving forcibly the disk ejecting motor based on the determining step.

9. The method set forth in claim 8, wherein said step (d) receives the subsequent command for ejecting the disk generated when a switch disposed at a front panel of the disk drive is pressed.

10. The method set forth in claim 8, wherein said step (e) drives the disk ejecting motor for a predetermined time.

11. The method set forth in claim 10, wherein the predetermined time is determined based on a characteristic of the ejecting motor.

12. A disk ejecting method of a disk drive, comprising the steps of:
- (a) receiving a command requesting ejection of the inserted disk;
- (b) driving a loading motor to eject the disk according to the reception of the command;
- (c) detecting whether a signal is generated such that the motor is stopped;
- (d) determining if a subsequent command for ejecting the disk is generated after the signal is detected; and
- (e) forcibly driving the motor based on the determining step.

13. A disk ejecting method of a disk drive, comprising the steps of:
- (a) receiving a command requesting ejection of an inserted disk;
- (b) driving a disk ejecting motor to eject the disk according to the reception of the command;
- (c) detecting whether an abnormal state is occurred due to an upside-down insertion of the disk or not clamped exactly;
- (d) determining whether a subsequent command for ejecting the disk is received; and
- (e) driving forcibly the disk ejecting motor for a predetermined time based on the determining step.

\* \* \* \* \*